Patented June 29, 1948

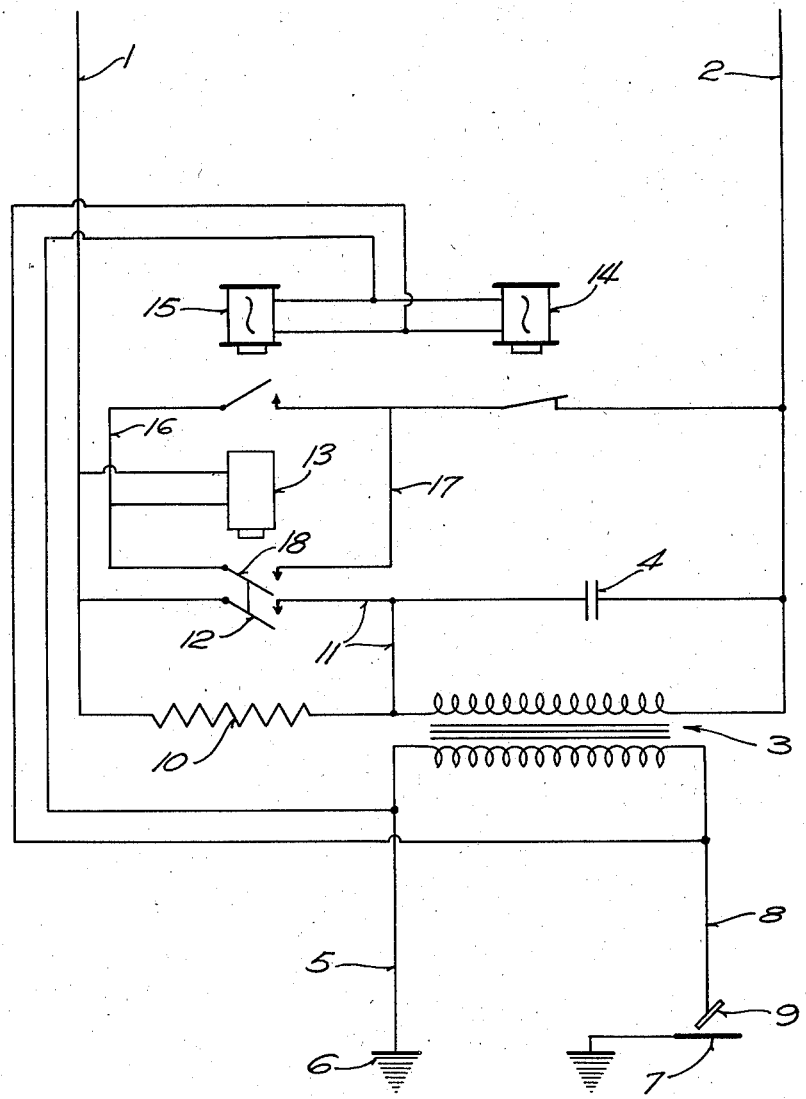

2,444,168

UNITED STATES PATENT OFFICE 2,444,168

VOLTAGE REDUCER FOR ARC WELDING CIRCUITS AND THE LIKE

Allen C. Mulder, Appleton, Wis., assignor to Miller Electric Manufacturing Co., Appleton, Wis., a corporation of Wisconsin Application May 19, 1945, Serial No. 594,769

9 Claims. (Cl. 315—279)

This invention relates to a voltage reducer for arc welding circuits and the like.

The invention is particularly applicable to the automatic reduction of the open circuit voltage of the secondary of a transformer, and in arc welding it serves the purpose of reducing the voltage between the electrode or its holder and the work or ground when the welding arc is not present, and thereby adds greatly to the safety of the operator.

The principal object of the present invention is to provide a simple and inexpensive device connected in the transformer circuit for automatically reducing the open circuit voltage output thereof.

Another object of the invention is to provide for a reduced open circuit voltage output of a transformer by automatically reducing the voltage of the primary winding upon opening of the secondary circuit.

Another object is to provide a welding transformer with means to automatically reduce the open circuit voltage output without the use of expensive rectifier circuits and the like.

According to the invention a resistance is disposed in series with the primary winding of the transformer and is automatically shunted out by a relay circuit operable by the voltage drop across the load. When there is no load and the voltage drop for the secondary leads is at its maximum, the relay operates to disconnect the shunt circuit, leaving the resistance to cut down the voltage applied to the primary winding. When the load is full and the working voltage drop across the secondary leads is substantially less than the open circuit maximum, the relay operates to shunt the resistance and apply an increased voltage to the primary winding.

A circuit diagram for an alternating current arc welder embodying the invention is illustrated in the accompanying drawing.

The welding circuit comprises, in general, the supply lines 1 and 2 adapted to be connected to a suitable source of alternating current and which feed power to the primary of the welding transformer 3. A suitable condenser 4 is connected across the primary winding to improve the power factor of the welder.

The secondary of the transformer 3 is connected at one end by line 5 to the ground 6, which in arc welding constitutes the work 7, and at the other end by line 8 to the arc welding electrode 9.

For the purpose of facilitating striking of the arc, the transformer is constructed with characteristics providing an open circuit voltage for the secondary in excess of 80 volts, whereas the voltage under load is usually around 40 volts. The high open circuit voltage is necessary to facilitate striking of the arc between the electrode 9 and the work 7.

In order to provide greater safety for the welder in the event of his accidental contact of both the electrode 9 and the work during open circuit conditions, it is desirable to reduce the open circuit voltage and at the same time retain the availability of the higher voltage for striking the arc.

In carrying out the invention, a high resistance 10 is connected in series with the primary winding and a shunt circuit 11 with a switch 12 therein is adapted to bypass the resistance during welding.

The switch 12 is automatically operated to close only during striking and continuance of the arc, and to open upon breaking of the arc and remain open during open circuit of the secondary. For this purpose a holding solenoid 13 is connected across the lines 1 and 2 and is energized in response to a relay control operated by the potential difference across the secondary leads 5 and 8.

The relay control comprises a high voltage relay 14 and a low voltage relay 15 with their windings connected in parallel and across the leads 5 and 8 of the transformer secondary. The voltage at which relay 14 will operate to open the circuit of holding coil 13 is higher than the maximum arc potential drop and lower than the open circuit voltage for leads 5 and 8. The voltage at which relay 15 will operate to open its corresponding switch in line 16 is substantially lower than the minimum arc potential drop and lower than the selected reduced voltage of the secondary when the current in the primary has to pass through resistance 10.

Line 16 and line 17 are parallel branch lines in the circuit of holding coil 13. Relay 15 opens and closes line 16 while a switch 18 operated by holding coil 13 opens and closes line 17. The switch of relay 14 is in series with the switch of relay 15 and also with switch 18, while the switch of relay 15 is in parallel to switch 18. If relays 14 and 15 are closed the holding coil 13 is energized to close switches 12 and 18.

The operation of the welder is as follows: assume that the leads 1 and 2 are connected to a suitable source of power, such as a 440 volt single phase alternating current line, and that the relays and switches are in the position indicated prior to the starting of the welding operation. The switches 12 and 18 are open by reason of the de-energization of coil 13 and the relay 14 is de-energized and closed while relay 15 is held open.

When the welder strikes rod 9 against work 7 the potential drop between leads 5 and 8 approaches zero thereby de-energizing relay 15 and closing the circuit for holding coil 13 through relay 14, relay 15 and line 16. Energization of holding coil 13 closes switches 12 and 18.

Closing of switch 12 bypasses or shunts resistance 10 and provides the full line voltage for the primary of transformer 3 thereby enabling the welder to strike the arc.

Closing of switch 18 provides a holding circuit for coil 13 through line 17, switch 18, and relay 14. When the arc is struck, the raise in potential drop between leads 5 and 8 energizes relay 15 and opens its switch in line 16.

During maintenance of the arc switches 12 and 18 remain closed and the welding operation may progress normally.

When the welder breaks the arc, as upon completion of the welding operation, the potential across leads 5 and 8 tends to rise to open circuit voltage, thereby energizing relay 14 and opening the circuit of holding coil 13. This effects opening of switches 12 and 18, the former opening the shunt circuit 11 so that the current through the primary has to pass through resistance 10, thereby reducing the voltage applied to the transformer and the open circuit voltage of leads 5 and 8.

Upon reduction of the open circuit voltage as described, relay 14 becomes de-energized and closes. However, since relay 15 remains energized and is open and switch 15 remains open, coil 13 will not become energized until the electrode 9 is again contacted with the work 7 for striking an arc.

The resistance 10 is preferably designed to reduce the voltage applied to the primary of transformer 3 by at least 50%, thereby reducing the actual open circuit voltage of secondary leads 5 and 8 to less than 40 volts.

Should a welder accidentally contact with both the terminal for rod 9 and the work during open circuit conditions, the voltage will not be sufficiently high to administer a serious shock and the current flow will normally not be sufficient to de-energize relay 15.

By employing a shunt circuit for the resistance 10 and cutting the same in and out, the transformer is always energized and there is no interruption in the available secondary potential, particularly at the time of striking the arc.

Various embodiments of the invention may be employed within the scope of the accompanying claims.

I claim:

1. In combination with a transformer of high voltage open circuit characteristics, a voltage reducer comprising a substantially high resistance connected in series with the primary of the transformer to reduce the voltage applied thereto, a shunt for said resistance to apply full line voltage to the primary of the transformer, a switch for opening and closing said shunt circuit, a holding coil for said switch, and a relay system connected to the secondary leads of the transformer to respond to the potential difference therebetween for operating said holding coil and switch to open said shunt circuit during periods of substantially no load and close the same during periods of substantial load on said transformer.

2. In combination with a transformer of high voltage open circuit characteristics, a voltage reducer comprising a substantially high resistance connected in series with the primary of the transformer to reduce the voltage applied thereto, a shunt for said resistance to apply full line voltage to the primary of the transformer, a switch for opening and closing said shunt circuit, a holding coil for said switch, and a relay system connected to the secondary leads of the transformer to differentially respond to high and low potential differences therebetween for operating said holding coil to open said shunt circuit during periods of substantially no load and close the same during periods of substantial load on said transformer.

3. In combination with a transformer of high voltage open circuit characteristics, a voltage reducer comprising a substantially high resistance connected in series with the primary of the transformer to reduce the voltage applied thereto, a shunt for said resistance to apply full line voltage to the primary of the transformer, a switch for opening and closing said shunt circuit, a holding coil for said switch, a relay system connected to the secondary leads of the transformer to differentially respond to high and low potential differences therebetween for operating said holding coil to open said shunt circuit during periods of substantially no load and close the same during periods of substantial load on said transformer, and a locking circuit operable by said holding coil to retain energization of the same during periods of load on the transformer.

4. In an alternating current electric arc welder, a transformer having its primary connected across current supply lines and its secondary connected by opposite leads to the work and to an operating electrode, respectively, a high resistance in series with the primary of the transformer, a shunt circuit for said resistance, means energized by the transformer secondary and responsive to the open circuit potential of the secondary to open said shunt circuit, and means normally energized by the transformer secondary and de-energized in response to the short circuiting of said secondary to close said shunt circuit.

5. In an alternating current electric arc welder, a transformer having its primary connected across current supply lines and its secondary connected by opposite leads to the work and to an operating electrode, respectively, a high resistance in series with the primary of the transformer, a shunt circuit for said resistance, means energized by the transformer secondary and responsive to the open circuit potential of the secondary to open said shunt circuit, means normally energized by the transformer secondary and de-energized in response to the short circuiting of said secondary to close said shunt circuit, and a locking circuit for holding said shunt circuit closed during striking and maintenance of a welding arc.

6. In an alternating current electric arc welder, a transformer having its primary connected across current supply lines and its secondary connected by opposite leads to the work and to an operating electrode, respectively, a high resistance in series with the primary of the transformer, a shunt circuit for said resistance, means energized by the transformer secondary and responsive to a rise in voltage of the secondary above a predetermined value to open said shunt circuit, and means energized by the transformer secondary and responsive to a drop in voltage of the secondary below a predetermined value to close said shunt circuit.

7. In an alternating current electric arc welder, a transformer having its primary connected across current supply lines and its secondary connected by opposite leads to the work and to an operating electrode, respectively, a high resistance in series with the primary of the transformer, a shunt circuit for said resistance, means energized by the transformer secondary and responsive to a rise in voltage of the secondary above a predetermined value to open said shunt circuit, means energized by the transformer secondary and responsive to a drop in voltage of the secondary below a predetermined value to close said shunt circuit, and a locking circuit for holding said shunt circuit closed during striking and maintenance of a welding arc.

8. In combination with a transformer of high voltage open circuit characteristics, a voltage control comprising means connected in series with the primary of the transformer to substantially reduce the voltage applied thereto, a shunt circuit for said means to apply substantially full line voltage to the primary, and a relay system connected to the secondary leads of the transformer to respond to the voltage thereof to open said shunt circuit upon establishing substantially no load conditions for the secondary, to close said shunt circuit only at a secondary voltage near to short circuit and below normal working voltages, and to hold said shunt circuit closed thereafter during the maintenance of working voltages under normal load conditions.

9. In combination with a transformer of high voltage open circuit characteristics, a voltage control comprising means connected in series with the primary of the transformer to substantially reduce the voltage applied thereto, a shunt circuit for said means to apply substantially full line voltage to the primary, a relay for closing and opening said shunt circuit, a second relay connected across the secondary leads to close the circuit for said first named relay only when the voltage drop of said secondary leads is substantially below normal working voltages, a holding circuit operable by said first named relay to maintain the same in shunt closing position after closing of the circuit thereof by said second relay and during normal working loads for the secondary, and a relay operable to open said holding circuit upon substantial removal of the load from the secondary to thereby open said shunt and reduce the open circuit voltage for the transformer.

ALLEN C. MULDER.

REFERENCES CITED

The following references are of record in the file of this patent:

UNITED STATES PATENTS

| Number | Name | Date |
|---|---|---|
| 1,321,342 | Van Swaay & Keus | Nov. 11, 1919 |
| 2,140,386 | Jones | Dec. 13, 1938 |
| 2,315,625 | King | Apr. 6, 1943 |